United States Patent [19]
Evans

[11] Patent Number: 6,014,915
[45] Date of Patent: Jan. 18, 2000

[54] GEAR HOUSING

[75] Inventor: Dale M Evans, Windsor, Wis.

[73] Assignee: Precision Products Systems, LLC, Madison, Wis.

[21] Appl. No.: 09/095,736

[22] Filed: Jun. 11, 1998

[51] Int. Cl.[7] ............................................... F16H 57/02
[52] U.S. Cl. ........................................ 74/606 R; D15/149
[58] Field of Search .............................. 74/606 R, 607; D15/149; 49/349

[56] References Cited

U.S. PATENT DOCUMENTS

| | | | |
|---|---|---|---|
| D. 116,553 | 9/1939 | Drake | D15/149 |
| D. 138,774 | 9/1944 | Hodges et al. | D15/149 |
| 1,246,930 | 11/1917 | Jenney | 74/606 R X |
| 2,477,576 | 8/1949 | Buckendale | 74/607 |
| 2,478,180 | 8/1949 | Buckendale | 74/607 |
| 4,367,660 | 1/1983 | Becker et al. | 74/625 |
| 4,643,040 | 2/1987 | Adam et al. | 74/425 |

*Primary Examiner*—Mary Ann Battista
*Attorney, Agent, or Firm*—Quarles & Brady LLP

[57] ABSTRACT

A gear housing for use in a worm gear drive mechanism having an output shaft, has an integral backwall adapted to support the shaft. The backwall has a cylindrical central portion for receiving one end of the output shaft. A plurality of equal pie shaped segments extend radially from the central portion providing support for the central portion in compression. Each segment has a narrow end, a wide end, and sides. The narrow end of adjacent segments alternately form an integral part of the central portion above and below a plane orthogonal to a central axis of the central portion.

14 Claims, 4 Drawing Sheets

GEAR HOUSING

CROSS REFERENCES TO RELATED APPLICATIONS

Not Applicable

STATEMENT REGARDING FEDERALLY SPONSORED RESEARCH

Not Applicable

BACKGROUND OF THE INVENTION

The field of invention is gear housings, more particularly gear housings for a motor vehicle window lift drive.

In a known motor vehicle window lift drive, a rotatably driven worm drive shaft engages a toothed gear, such as a worm wheel, disposed in a gear housing. The worm wheel has an output shaft with one end extending radially through the gear housing for rotatably driving a window lift mechanism. An opposite end of the output shaft extends radially into a backwall of the gear housing. The backwall supports the output shaft by counteracting forces exerted onto the backwall by the output shaft.

In addition to axial forces, the output shaft transmits radial and tangential forces developed at the worm wheel toothing and worm drive shaft interface. These forces are absorbed by the backwall by various means and methods. One known housing provides sufficient structural integrity in the housing backwall by providing a thickened backwall wall. However, a thickened plastic or metal housing adds unnecessary weight to the overall mechanism and requires a greater amount of material to fabricate than other alternatives.

Another known housing incorporates strengthening ribs in the backwall to provide support and structural integrity in key locations. This housing requires less material and, therefore, provides a lighter housing that is less expensive to produce than the method described above. The ribs, however, require fabrication of the housing with varying wall thicknesses that concentrate stresses increasing the potential for fatigue failure and require looser fabrication tolerances increasing material requirements.

BRIEF SUMMARY OF THE INVENTION

The present invention provides an improved gear housing for use in a worm gear drive mechanism having an output shaft. The housing has an integral backwall adapted to support the output shaft of the drive mechanism. The backwall has a cylindrical central portion for receiving one end of the output shaft. A plurality of equal pie shaped segments extend radially from the central portion providing support for the central portion in tension and compression. Each segment has a narrow end, a wide end, and sides. The narrow end of adjacent segments alternately form an integral part of the central portion above and below a plane orthogonal to a central axis of the central portion. The wide end of each segment converges on the plane at the backwall periphery.

A general objective of the present invention is to provide a plastic gear housing having a backwall that supports the output shaft without requiring excess plastic material for structural integrity. The housing backwall of the present invention is formed with a substantially uniform wall thickness that does not require thicker wall sections to adequately support the output shaft.

Another objective of the present invention is to provide a plastic gear housing that requires less material to fabricate.

The housing backwall of the present invention having a substantially uniform wall thickness can be fabricated to tighter tolerances reducing the material required to fabricate the article.

Yet another objective of the present invention is to provide an improved gear housing that is less susceptible to fatigue failure than the prior art. The housing backwall of the present invention supports the output shaft with compression members that are less susceptible to fatigue than tension members found in the prior art.

The foregoing and other objects and advantages of the invention will appear from the following description. In the description, reference is made to the accompanying drawings which form a part hereof, and in which there is shown by way of illustration a preferred embodiment of the invention.

DETAILED DESCRIPTION OF THE PREFERRED EMBODIMENTS

Figure 1:
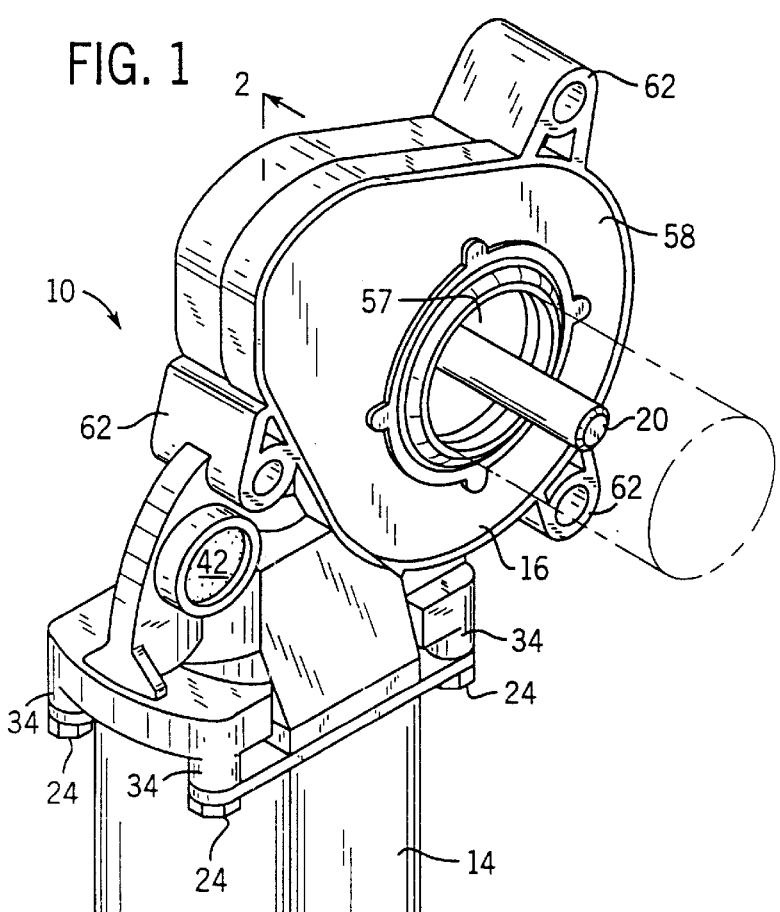
FIG. 1 is a perspective view of a window lift incorporating the present invention.
Figure 2:
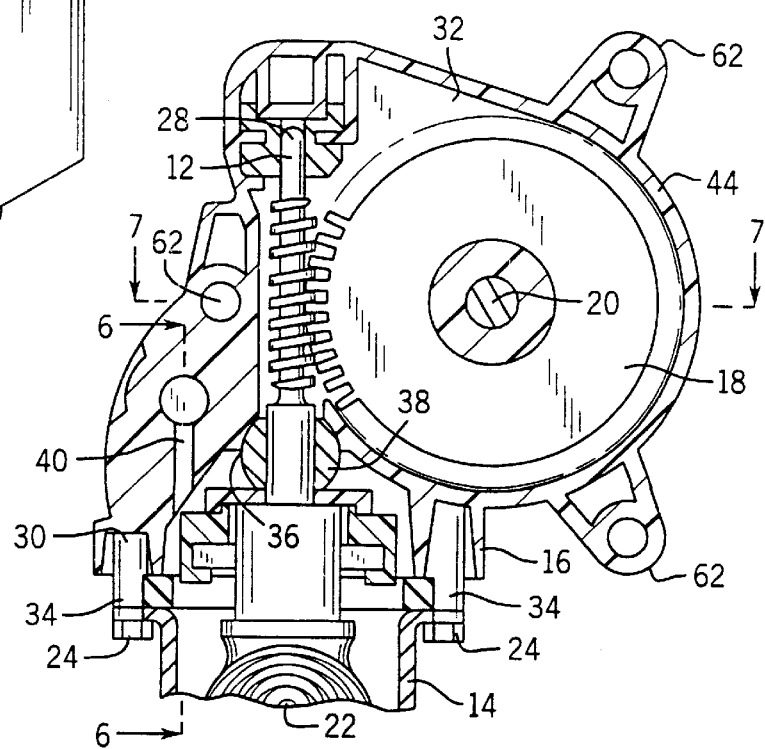
FIG. 2 is a partial sectional view along line 2—2 of FIG. 1.

As shown in FIGS. 1 and 2, an embodiment of the present invention is a direct current motor vehicle window lift drive 10. The motor drive 10 has a worm drive shaft 12 disposed in a motor housing 14 that is flange mounted to a gear housing 16. The drive shaft 12 engages a worm wheel 18 press fit, or mounted by other methods known in the art, on an axially extending output shaft 20. The worm wheel 18 is adapted for rotatably driving a window lift mechanism (not shown) that raises and lowers an automobile window (not shown).

Looking particularly at FIG. 2, the drive shaft 12 has a first end 22 disposed within the motor housing 14. The drive shaft first end 22 accommodates a laminated core of a rotor provided with a rotor (armature) winding. A drive shaft distal end 28 opposite the first end 22 extends into the gear housing 16 and is adapted to drive the worm wheel 18. The drive shaft 12 is rotatably mounted in the motor housing 14 by methods known in the art. A motor housing 14 and drive shaft 12 for use with the present invention are disclosed in U.S. Pat. No. 5,517,070, Schmidt and incorporated herein by reference.

The gear housing 16 has a flange mounting portion 30 and a cavity 32. Preferably, the gear housing 16 is polybutylene terepthalate having a glass fiber filler, such as Valox 420, available from GE Plastics, Pittsfield, Mass. or Celanex 7246 available from Ticona GmbH, Germany. Other materials exhibiting similar properties may be used without departing from the scope of the present invention. The housing 16 is preferably formed by injection molding or other methods known in the art.

Figure 6:
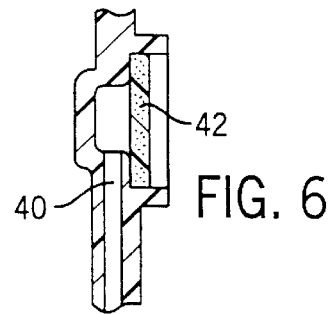
FIG. 6 is a sectional view along line 6—6 of FIG. 2.

The flange mounting portion 30 is flange mounted to the motor housing 14 by screws 24, or the like, received by screw bosses 34 integrally formed part of the gear housing 16. The drive shaft distal end 28 extends into the gear housing cavity 32 through an opening 36 in the flange mounting portion 30. The opening 36 is adapted to receive a bushing 38 that radially supports the drive shaft 12. As shown in FIG. 6, a breather passage 40 formed part of the flange mounting portion 30 receives a filter 42 and allows air to vent from the motor housing 14.

Figure 3:
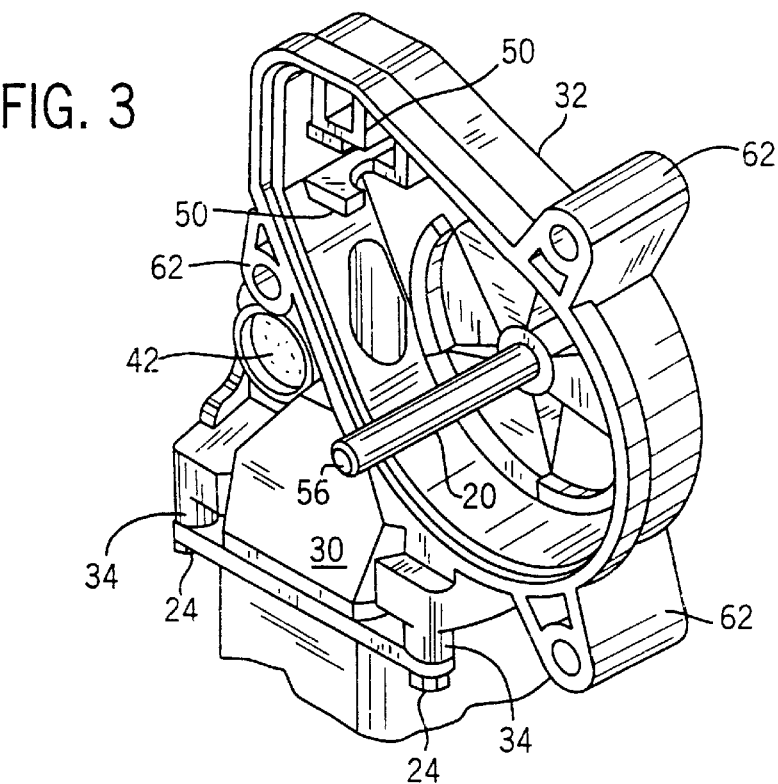
FIG. 3 is a front right perspective view of the gear housing of FIG. 1 with the housing cover removed.
Figure 4:
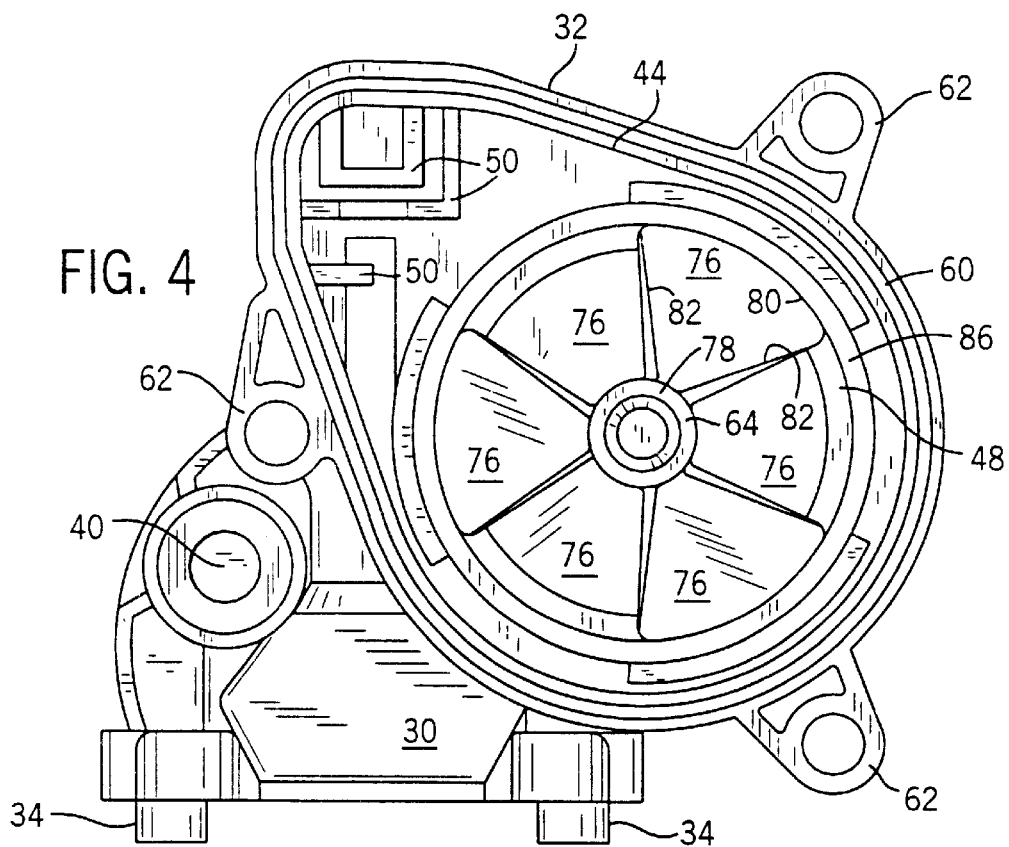
FIG. 4 is a front elevation view of the gear housing of FIG. 1 with the housing cover removed.
Figure 5:
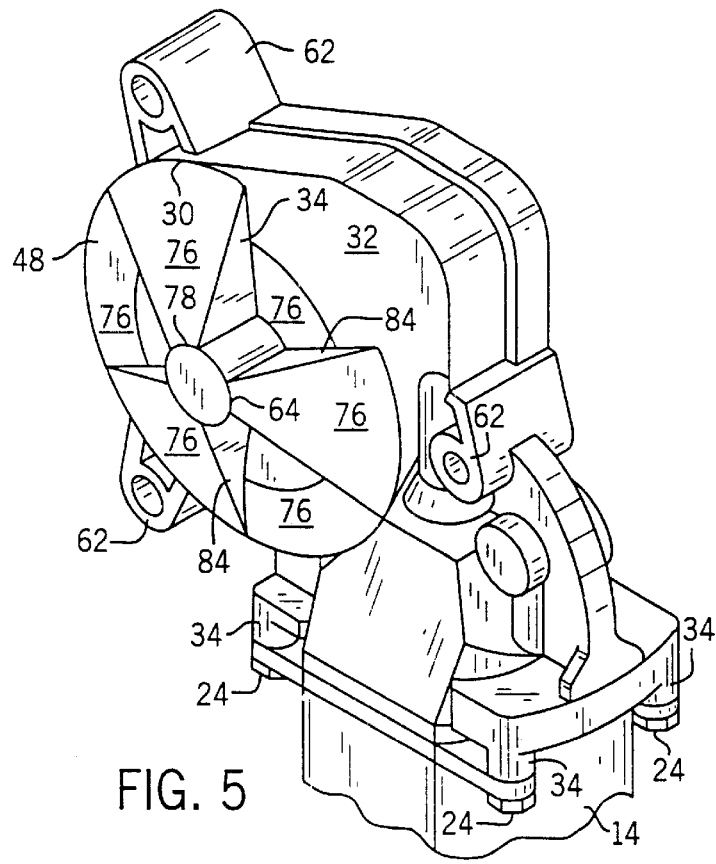
FIG. 5 is a left rear perspective view of the gear housing of FIG. 1.

As shown in FIGS. 2-4, the cup shaped cavity 32 of the gear housing 16 is integrally formed part of the flange mounting portion 30 and is defined by a sidewall 44 along the cavity periphery and a backwall 48 that supports the worm gear output shaft 20. The cavity 32 is generally circular and adapted to receive the rotatably mounted worm wheel 18 that tangentially engages the drive shaft 12. Supports 50 integrally formed part of the cavity sidewall 44 prevent excessive axial and radial movement of the drive shaft 12 in the gear housing 16. Through hole bosses 62 formed an integral part of the gear housing sidewall 44 provide attachment points for coupling the assembled motor vehicle window lift drive 10 to the window lift mechanism (not shown).

Figure 7:
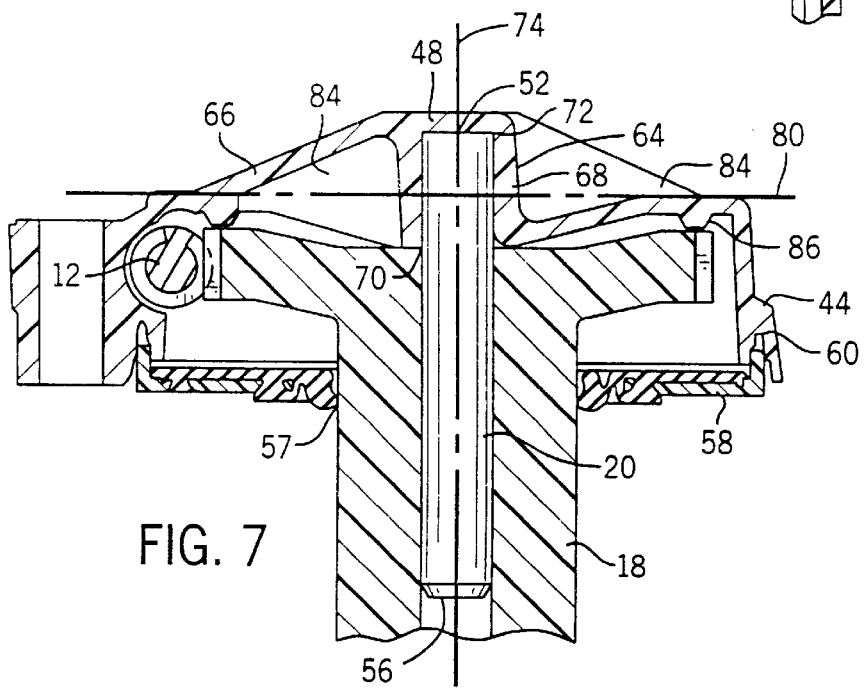
FIG. 7 is a sectional view along line 7—7 of FIG. 2.

Referring to FIG. 7, the worm wheel 18 is press fit on an axially extending output shaft 20 and ratably drives the window lift mechanism (not shown). The output shaft 20 has one end 52 supported by the backwall 48 and the opposite end 56 extending through an opening 57 in the housing cover 58 for engagement with the window lift mechanism (not shown).

The housing cover 58 is mounted on the housing sidewall 44 by methods known in the art, such as press fitting or ultrasonic welding. Preferably, a groove 60 formed in the housing sidewall 44 is adapted to receive the cover 58 and provide a seal that protects the components inside the window lift drive 10 from adverse conditions.

The novelty of the present invention resides in the gear housing backwall 48. As shown in FIGS. 3–5 and 7, the backwall 48 has a generally cylindrical central portion 64 for receiving the output shaft end 52 and a support portion 66 that is an integral part of the central portion 64.

The central portion 64 has a cylindrical sidewall 68, an open top 70, a closed bottom 72, and a central axis 74. The output shaft end 52 is received in the open top 70 and supported axially by the closed bottom 72 and radially by the central portion sidewall 68. Although the central portion bottom 72 is closed in the preferred embodiment, an open bottom may also be used without departing from the present invention. In an open bottom configuration, the output shaft can be axially supported by a bushing or other methods known in the art.

The backwall support portion 66 having a uniform wall thickness is formed by six pie shaped segments 76 that structurally support the central portion 64. Although six pie shaped segments are preferred, any number of pie shaped segments may be used without departing from the scope of the present invention.

Each pie shaped segment 76 has a narrow end 78, a wide end 80, and sides 82. Looking particularly at FIG. 7, the narrow end 78 of adjacent segments 76 alternately form an integral part of the central portion 64 above and below a common plane 80 that is orthogonal to the central portion central axis 74. The segments 76 extend radially away from the central portion 64 toward the housing sidewall 44 converging on the common plane 80 to form the backwall periphery at the intersection of the segments 76 and the common plane 80.

The sides 82 of adjacent segments 76 are joined by vertical sidewalls 84 providing additional structural support to the backwall 48. Although vertical sidewalls are shown and described, angled sidewalls may be used to join pie shaped segments that are narrower or wider than shown without departing from the scope of the present invention.

The uniform wall thickness of the backwall 48, advantageously requires less material to fabricate than prior art rib designs. Additionally, tighter fabrication tolerances may be maintained during fabrication without wall thickness variations created by strengthening ribs.

As shown in FIGS. 4 and 7, an annular ridge 86 integrally formed part of the backwall 48 and concentric with the central portion central axis 74 provides a thrust bearing surface for the rotating worm wheel 18. The ridge 86 is a wear surface that is intended to wear away over time instead of the backwall 48, thus prolonging the useful life of the gear housing 16.

Figure 8:
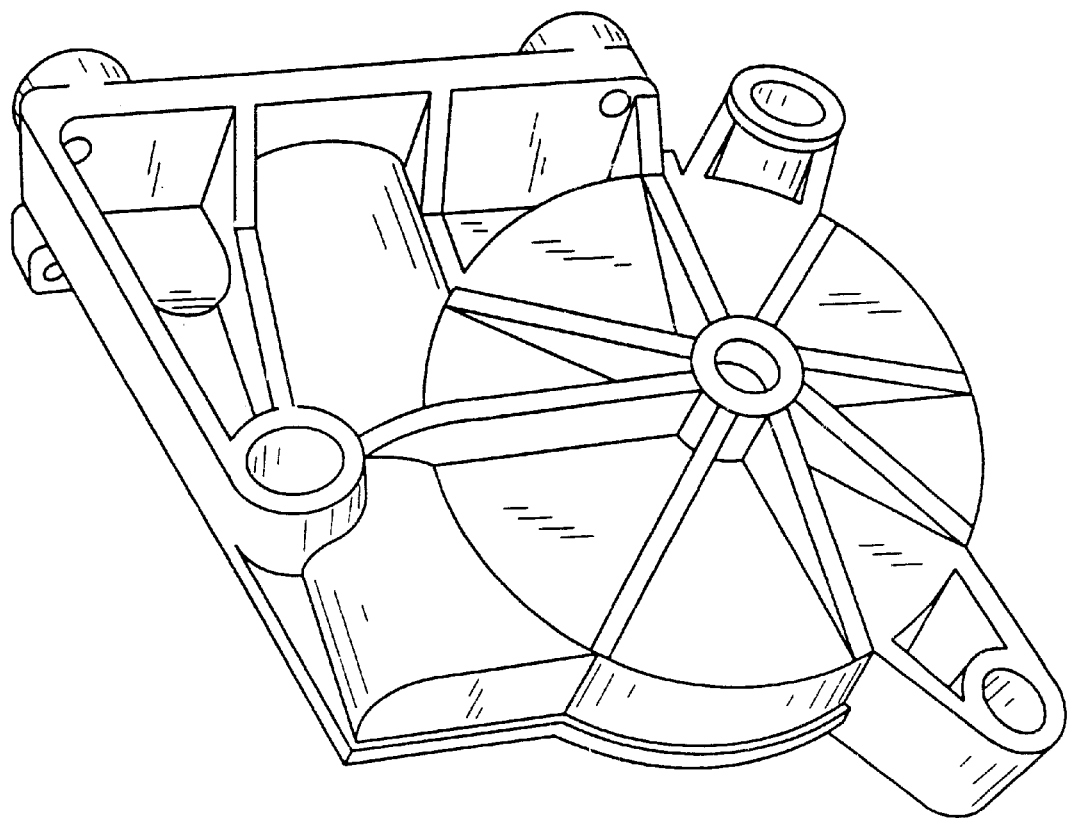
FIG. 8 is a top rear perspective view of a prior art gear housing having support ribs.

A finite element analysis comparing a gear housing having a rib design, shown in FIG. 8, and an embodiment of the present invention as described above revealed a Major Principle Strain in the embodiment of the present invention that is 42% less than Major Principle Strain of the rib design. The material characteristics of Valox 420 and a backwall support portion nominal wall thickness of 2 mm were used in the calculations.

Forces exerted on the backwall by the rotating output shaft cause the prior art backwall housing to alternate between compression and tension in order to support the shaft end. The alternating segments ensures that the output shaft is always supported by a compression member, thus reducing the required backwall thickness required to support the shaft in tension as required in prior art rib designs.

While there has been shown and described what are at present considered the preferred embodiment of the invention, it will be obvious to those skilled in the art that various changes and modifications can be made therein without departing from the scope of the invention defined by the appended claims.

I claim:

1. A gear housing for use with a toothed gear having an output shaft, said housing comprising:

a cup shaped cavity having a generally circular backwall and a central axis;

a cylindrical portion extending through a plane orthogonal to said central axis; and a plurality of segments surrounding said cylindrical portion, each of said segments having a narrow end and a wide end, wherein said narrow end of alternating segments form an integral part of said cylindrical portion above said plane and said narrow end of the remaining alternating segments form an integral part of said cylindrical portion below said plane, wherein said wide end of said plurality of segments converge upon said plane.

2. A gear housing as claimed in claim 1, wherein adjacent segments are joined by sidewalls.

3. A gear housing as claimed in claim 2, wherein said sidewalls are adapted to be substantially parallel to said output shaft.

4. A gear housing as claimed in claim 1, wherein said housing is formed from polybutylene terepthalate.

5. A gear housing as claimed in claim 1, wherein said housing is formed by injection molding.

6. A gear housing as claimed in claim 1, wherein said backwall has an annular ridge.

7. A gear housing as claimed in claim 1, wherein said backwall has a nominal wall thickness of no more than 2 mm.

8. A gear housing assembly suitable for use with a window lift mechanism, said housing assembly comprising:

a cup shaped cavity having a generally circular backwall and a central axis;

a cylindrical portion extending through a plane orthogonal to said central axis;

a plurality of segments surrounding said cylindrical portion, each of said segments having a narrow end and a wide end, wherein said narrow end of alternating segments form an integral part of said cylindrical portion above said plane and said narrow end of the remaining alternating segments form an integral part of said cylindrical portion below said plane, wherein said wide end of said plurality of segments converge upon said plane; and a gear having an output shaft concentric with said central axis and disposed in said cavity, wherein one end of said output shaft extends into said cylindrical portion.

9. A gear housing assembly as claimed in claim 8, wherein said gear is rotatably driven by a worm drive shaft.

10. A gear housing assembly as claimed in claim 8, wherein said gear is a worm wheel.

11. A gear housing assembly as claimed in claim 8, wherein said output shaft rotatably drives a window lift mechanism.

12. A gear housing backwall forming part of a gear housing, said backwall comprising:

a central portion having a central axis intersecting a plane orthogonal to said central axis; and a plurality of segments surrounding said central portion, each of said segments having a narrow end, a wide end, and sides, wherein said narrow end of alternating segments form an integral part of said central portion above said plane and said narrow end of the remaining alternating segments form an integral part of said central portion below said plane, wherein said wide end of said plurality of segments converge on said plane.

13. A gear housing backwall as claimed in claim 12, wherein said sides of adjacent segments are joined by sidewalls.

14. A gear housing backwall as claimed in claim 13, wherein said sidewalls are substantially parallel to said central axis.

* * * * *